(No Model.) 5 Sheets—Sheet 1.

J. W. HUTT & A. J. PHILLIPS.
PLUNGER FOR BOX FOLDING MACHINES.

No. 494,811. Patented Apr. 4, 1893.

Witnesses
J. Edw. Maybee
W. G. McMillan

Inventors
James W. Hutt
Arthur J. Phillips
by Donald C. Ridout & Co
Attys (No Model.) 5 Sheets—Sheet 2.

J. W. HUTT & A. J. PHILLIPS.
PLUNGER FOR BOX FOLDING MACHINES.

No. 494,811. Patented Apr. 4, 1893.

Witnesses
J. Edw. Maybee
N. G. McMillan

Inventors
James W. Hutt
Arthur J. Phillips
by Donald C. Ridout & Co
attys.

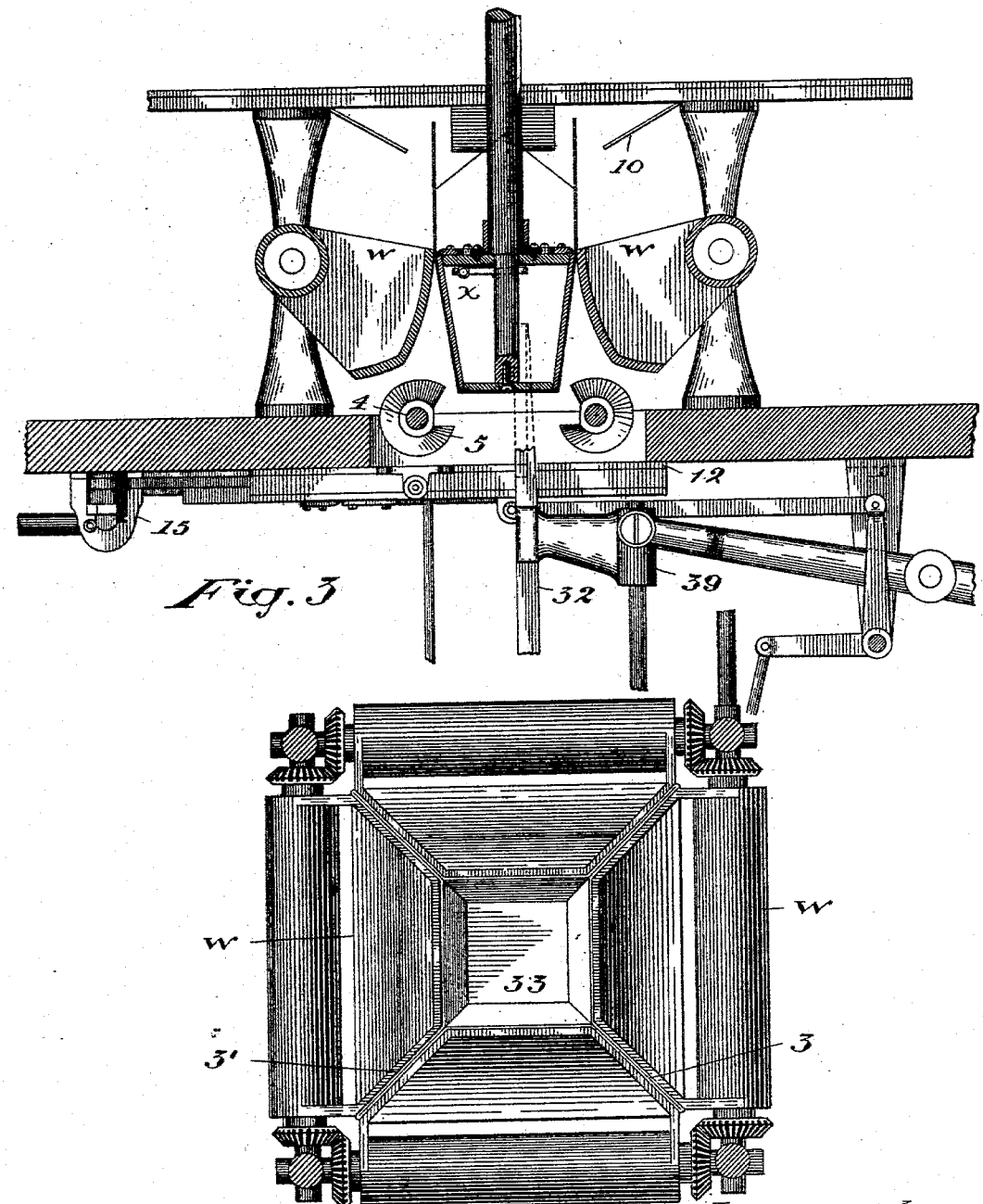

(No Model.) 5 Sheets—Sheet 4.

J. W. HUTT & A. J. PHILLIPS.
PLUNGER FOR BOX FOLDING MACHINES.

No. 494,811. Patented Apr. 4, 1893.

Witnesses
J. Edw. Maybee
W. G. McMillan

Inventors
James W. Hutt
Arthur J. Phillips
by Donald C. Ridout & Co.
attys.

(No Model.) 5 Sheets—Sheet 5.

J. W. HUTT & A. J. PHILLIPS.
PLUNGER FOR BOX FOLDING MACHINES.

No. 494,811. Patented Apr. 4, 1893.

Witnesses
J. Edw. Maybee
H. G. McMillan

Inventors
James W. Hutt
Arthur J. Phillips
by Donald C. Ridout & Co.
Attys.

UNITED STATES PATENT OFFICE.

JAMES W. HUTT AND ARTHUR J. PHILLIPS, OF TORONTO, CANADA.

PLUNGER FOR BOX-FOLDING MACHINES.

SPECIFICATION forming part of Letters Patent No. 494,811, dated April 4, 1893.

Application filed January 14, 1892. Serial No. 418,081. (No model.)

*To all whom it may concern:*

Be it known that we, JAMES WILLIAM HUTT and ARTHUR JAMES PHILLIPS, both of the city of Toronto, in the county of York, in the Province of Ontario, Canada, have jointly invented a certain new and useful Improvement in Plungers for Box-Folding Machines, of which the following is a specification.

The invention relates to a machine invented by us and fully described in specification attached to our application Serial No. 376,508 for an American patent.

The object of the invention is, first—to arrange the creasing plates so that they will perform their duty while passing between the folding rollers; secondly—to insure the proper clinching of the ends of the wire bail, and thirdly—to arrange the plunger so that the folded box will not be held on it by an atmospheric pressure, and it consists, essentially first—to arrange the plate or anvil against which the ends of the wire bail strike so that they will yield when the ends first come in contact with them; secondly, to arrange the creasing plates so that they will project beyond the surface of the plunger and be held by yielding springs to pierce the top and bottom of the plunger with holes; substantially as hereinafter more particularly explained.

Figure 1:
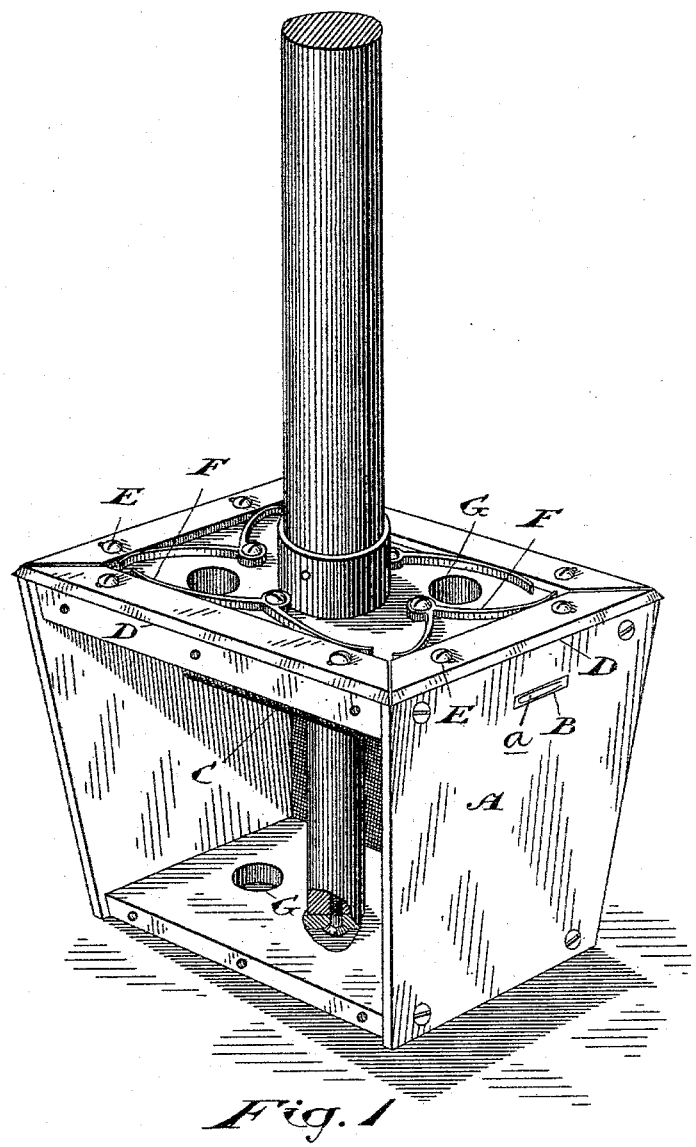
Figure 2:
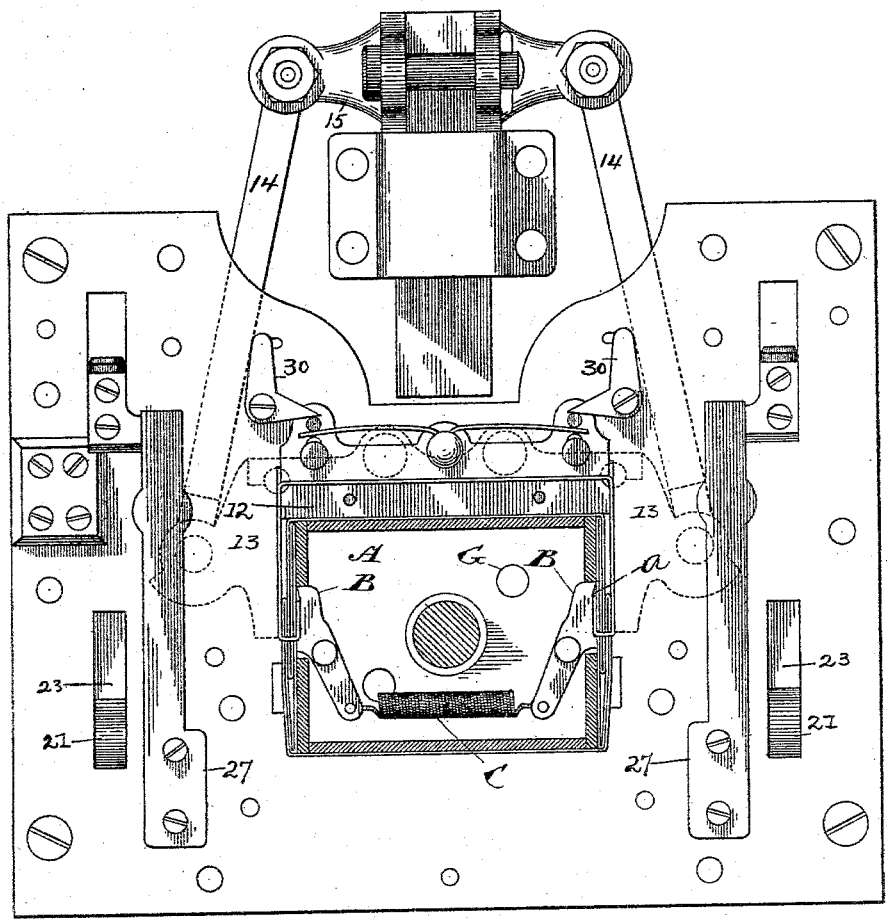
Figure 5:
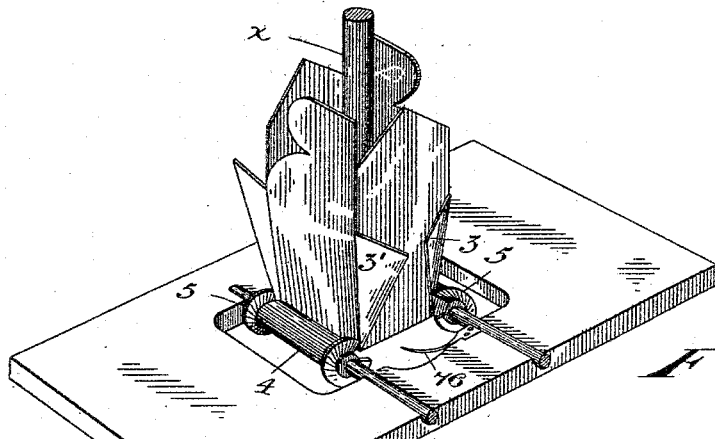
Figure 6:
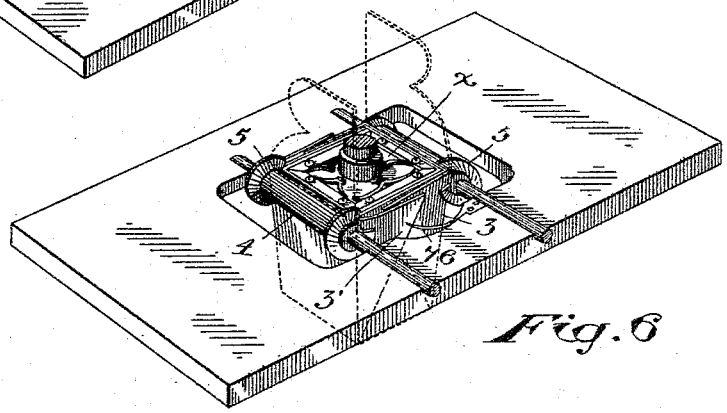
Figure 11:
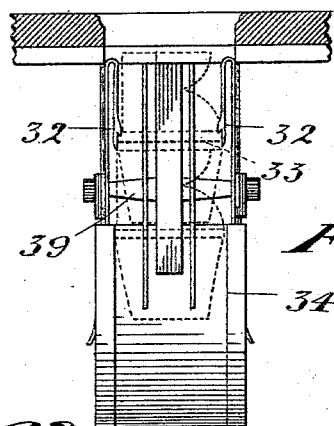
Figure 7:
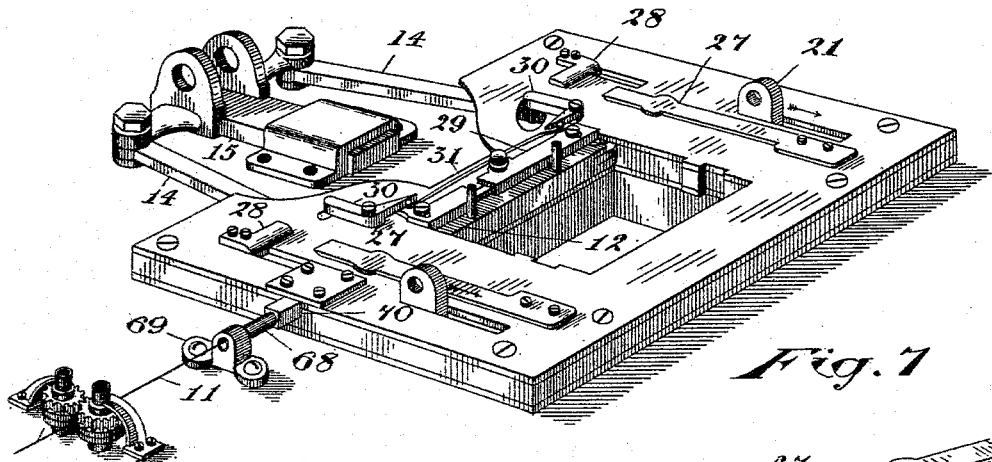
Figure 9:
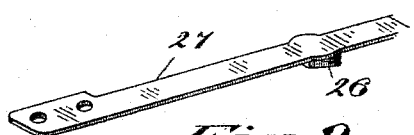
Figure 8:
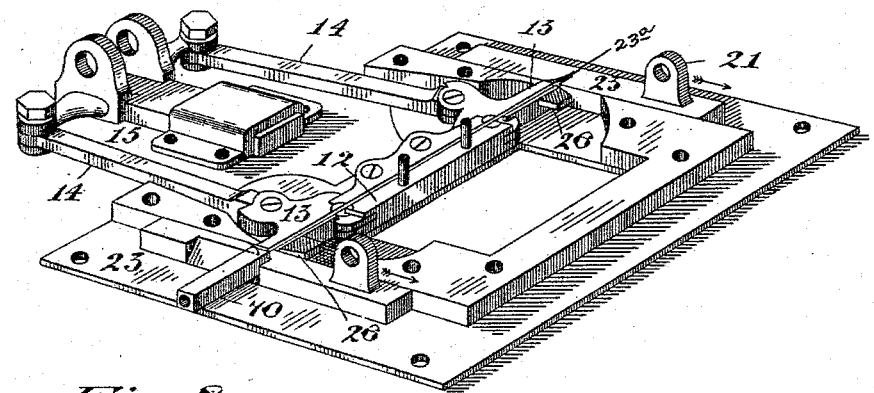
Figure 10:
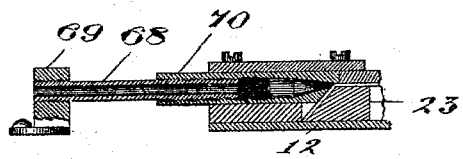

Figure 1, is a perspective view with one side removed, of our improved plunger. Fig. 2, is a plan of the bailing mechanism showing the plunger in section. Fig. 3, is a sectional side view of the folding cams plunger and bailer. Fig. 4, is a plan of the folding cams. Figs. 5 and 6, are perspective details of the mechanism for folding the flaps. Fig. 7, is a perspective view of the bail bending mechanism. Fig. 8, is a similar view of the same with parts removed. Fig. 9, is a perspective view of a spring plate detached, which is shown in position in Fig. 7. Fig. 10, is a sectional detail of tubes, &c., forming part of the same. Fig. 11, is a front elevation of part of the discharge mechanism.

For the purposes of the specification it will be sufficient to describe the parts immediately connected with our improvement.

On reference to Figs. 3, 4, 5 and 6, the operation of the folding device will be readily understood. The blank is carried by suitable means and deposited above the folding cams $w$. Four plates 10, supported as shown are provided, arranged one on each side of the plunger forming a rectangular opening. These plates are intended for the purpose of supporting and steadying the blank as it is being formed into shape.

The plunger A, is suitably supported and given a vertically reciprocating motion by suitable means. When the plunger A, descends, it forces the blank through the space formed by the plates 10, and between the folding cams $w$. These folding cams are geared together at right angles to one another (see Fig. 4) and are so shaped that when they are set in the position shown in Figs. 3 and 4, they shall form a rectangular opening corresponding in shape and size to the box they are intended to fold. These cams derive motion from the shaft X, operated in any suitable way and their operating mechanism is so timed that they will act against and fold the blank into the shape indicated as the plunger A, forces the blank between them.

On top of the plunger A, we hold the creasing plates D, by means of screws E, which pass through elongated holes made in the plates D, as indicated in Fig. 1. Behind each plate D, we place a curved spring F, each spring being set so that its tension shall force the outer edges of its plate beyond the surface of the plunger A. Each plate D, has a knife edge against which the cams $w$ press the sides of the box so as to crease the box at the base of the top plates and make them easy to fold. Owing to the fact that the plates D, are not rigidly held in position, they will not interfere with the folding cams or other mechanism the plunger A, is compelled to pass in forming the box. When the plunger A, forces the blank between the cam rollers $w$, the blank is made in the shape indicated in Fig. 5, with a flap at each corner.

In order to fold over the flaps 3, and 3', and complete the box, we place immediately below the folding cam $w$ two rollers 4. Each of these rollers is provided with two spiral flanges 5, the proper distance apart to correspond with the size of the plunger A. The rollers 4, make one revolution as the box is forced between them and they derive this motion by means of a rack meshing with and between two pinions on the ends of the rollers 4. This rack is driven in any suitable way. The rack and pinions are not shown in the drawings as it is not necessary for the purpose of the specification.

On reference to Figs. 5 and 6, a finger 76, will be seen, which projects toward the plunger A, and is designed to pass below the flap 3', and hold it back, while the opposite flap is folded below it. This finger 76 thus insures the perfect folding of the flaps. It is of course necessary to provide such a finger for each side. By the action of the plunger A, in forcing the blank between the rollers $w$ and rollers 4, the box or pail is folded into perfect shape, and by the time that the plunger is ready to return, the box is in the position to receive its wire bail.

On reference to Figs. 2, 7, 8, 9 and 10 the construction and operation of the bailing mechanism will be understood. When the form of the box is complete, as just described, the plunger A, remains stationary during the period that the bailing mechanism is in operation. The wire 11 (see Figs. 4 and 8) lies in a groove made in the stationary plate 12, the said groove being extended through the wings 13, which are hinged to the plate 12, as shown in Fig. 8. Two sliding bars 23, are each provided with a lug 21. These lugs are connected to suitable operating mechanism so that the bars 23, derive a reciprocating movement at the proper time. Each of the wings 13, is connected by a rod 14 to the cross-head 15 which is reciprocated by suitable mechanism. When the plunger A, is holding the recently formed box in the rectangular hole formed in the plate 12, the sliding bars 23, are drawn in the direction indicated by arrow. This movement bends the ends of the wire 11, around the lugs 26, shown in section in Fig. 4, and which are formed upon the spring plates 27. Simultaneously with this, the wire is cut off by the movement of the said sliding bars. Each bar 23, has a recess $23^a$, formed in it, only one of which is shown (see Fig. 8) the other one being hid by the tube 70. The wire after it comes from the feed rollers 47 and 48 (described further on) passes through a round tube 68 (see Figs. 8 and 9) screwed at one end into the lug 69 and at the other into the square tube 70. This tube butts against the hardened steel cutter attached to the sliding bar 23, and they together form a pair of shears to cut the wire. The interior of the tube 70, is tapered to the edge of the said sliding bar 23, and when the bar is moved, the wire is cut at the point of junction. The square tube 70, is adjusted against the sliding bar 23, by revolving the tube 68, which has a thread of coarser pitch in the lug 69 than in the tube 70. When the bars 23 begin to move in one direction indicated by arrow, the wire is cut off, and the wire lying in the recesses is bent around the lugs 26, to form the ends of the bail intended to penetrate the sides of the box. If the recesses were merely a groove large enough to contain the wire, the moving of the bars 23, would merely shear off the end of the wire, but as the rear of the recess is rounded away, as shown, it allows the wire to be drawn out and bent around lug 26, as described. By the time that the ends of the wire have been bent at right angles around the lugs 26, the wedge-shaped lifter 28, attached to the ends of the bars 23, has entered underneath the spring plate 27, and raised it so as to move its lugs 26, clear of the path of the bent wire 11. At this moment a rock shaft not shown moves so as to cause the wings 13 to move and fold the wire around the box held by the plunger A, forcing the ends of the wire through the sides of the box where they are bent and clinched by coming in contact with the surface of a curved recess formed in a plate B, projecting through a slot made in the plunger A (see Fig. 2), the said plate being actuated by a spring so that it will yield slightly when the wire strikes it.

In practice we have found that the unyielding recessed plate used as a clincher in the machine described in the hereinbefore mentioned application could not be depended upon to clinch the ends of the wire correctly and to accomplish this we arrange the plate or anvil, as described, so that it will yield when the ends of the bail are in contact with it, and we have found that the said yielding insures a perfect bend and clinch.

On reference to Fig. 2, it will be seen that each plate or anvil B, is supported on a pivot and so actuated by a spring C, that the portion of its surface in which the groove $a$, is made, shall project through the hole made in the side of the plunger A. The moment that the ends of the bail come in contact with the two plates or anvils B, the spring C, permits them to yield slightly, but is strong enough to provide the necessary resistance in order to cause the required bend and clinch.

We may mention here that the wire 11, is held in its groove through the plate 12, by a movable plate 29. This is held in position over the said wire (see Fig. 7) by the action of two bell-cranks 30, one being located at each of its ends. Each bell-crank is held as shown in this figure by the rod 14, while the wings 13 are in their initial position. As soon as the rods 14 commence to move, the wings 13 cause them to swing outwardly, gradually increasing the distance between the rods 14, so that by the time the wings have moved half their backward travel, the pressure is removed from the bell-cranks 30 and leaving the plate 29 free to be pushed clear of the wire groove by the action of its spring 31. In this way the wire bail is left free to move when the box has been properly bailed. At this point the spring fingers 32 are raised so as to clip over the top edge of the folded side flaps of the finished box 33 (see Fig. 11) and the plunger commences to move up, leaving the box free to be conveyed down by the fingers 32, into the chute or discharge spout 34. The spring fingers 32, are connected to the cross-head 39 operated in a suitable manner.

We have found that the plunger formerly in use frequently raised a completed box by the pressure of the atmosphere holding it upon the plunger. To avoid this, we make the holes G, through the top and bottom of the plunger A, through which air is admitted between the box and the plunger, thereby equalizing the pressure on the outside and inside of the box.

What we claim as our invention is—

1. A plunger on which boxes are formed, a yielding plate arranged in said plunger to act as an anvil to receive and bend the end of a wire bail, substantially as described.

2. A plunger provided with a plate or anvil B having a groove $a$ made in its surface, in combination with a spring C, substantially as described.

3. A plunger A having an opening in its side, a plate or anvil B situated within the plunger and provided with a groove $a$ opposite to the hole in the plunger, in combination with a spring C, substantially as described.

4. A plunger, the creasing plates D secured thereto by screws passing through elongated holes in said plates, in combination with the springs F, substantially as described.

Toronto, January 8, 1892.

JAMES W. HUTT.
ARTHUR J. PHILLIPS.

In presence of—
J. EDW. MAYBEE,
JOHN E. CAMERON.